United States Patent
Ma

(10) Patent No.: US 11,755,849 B2
(45) Date of Patent: Sep. 12, 2023

(54) INFORMATION SWITCHING METHOD, APPARATUS AND TRANSLATION DEVICE

(71) Applicant: BEIJING SOGOU TECHNOLOGY DEVELOPMENT CO., LTD., Beijing (CN)

(72) Inventor: Hailei Ma, Beijing (CN)

(73) Assignee: BEIJING SOGOU TECHNOLOGY DEVELOPMENT CO., LTD., Beijing (CN)

( * ) Notice: Subject to any disclaimer, the term of this patent is extended or adjusted under 35 U.S.C. 154(b) by 545 days.

(21) Appl. No.: 16/698,681

(22) Filed: Nov. 27, 2019

(65) Prior Publication Data
US 2020/0342063 A1   Oct. 29, 2020

(30) Foreign Application Priority Data
Apr. 26, 2019   (CN) .......................... 201910346005.2

(51) Int. Cl.
  *G06F 40/00*    (2020.01)
  *G06F 40/58*    (2020.01)
  (Continued)

(52) U.S. Cl.
  CPC .............. *G06F 40/58* (2020.01); *G01C 9/06* (2013.01); *G06F 3/017* (2013.01); *G06F 3/0346* (2013.01); *G06F 40/263* (2020.01)

(58) Field of Classification Search
  CPC ........ G06F 40/58; G06F 3/017; G06F 3/0346; G06F 40/263; G06F 17/30793;
  (Continued)

(56) References Cited

U.S. PATENT DOCUMENTS 6,427,098 B1   7/2002  Alverson et al.
7,173,604 B2 *  2/2007  Marvit ................... G06F 21/31
                                             345/158
(Continued)

FOREIGN PATENT DOCUMENTS

CN    1667747 A    9/2005
CN    101799716 A    8/2010
(Continued)

OTHER PUBLICATIONS

Jeter L, Mishra S. Identifying and quantifying the android device users' security risk exposure. In 2013 International Conference on Computing, Networking and Communications (ICNC) Jan. 28, 2013 (pp. 11-17). IEEE. (Year: 2013).*

(Continued)

*Primary Examiner* — Douglas Godbold
*Assistant Examiner* — Parker Mayfield
(74) *Attorney, Agent, or Firm* — ANOVA LAW GROUP PLLC

(57) ABSTRACT

The present disclosure provides an information switching method. The method includes: obtaining tilting information after an tilt direction of a device changes; searching a pre-set tilt direction matching the tilting information and determining pre-set information corresponding to the matched pre-set tilt direction; and switching first input information of the device to second input information, where the second input information is determined based on the pre-set information matching the pre-set tilt direction.

17 Claims, 7 Drawing Sheets

Obtaining tilting information after a tilt direction of a device changes — 102

Searching a pre-set tilt direction matching the tilting information and determining pre-set information corresponding to the matched pre-set tilt direction — 104

Switching first input information of the device to second input information, where the second input information is determined based on the pre-set information matching the pre-set tilt direction — 106

(51) Int. Cl.
*G06F 40/263* (2020.01)
*G01C 9/06* (2006.01)
*G06F 3/01* (2006.01)
*G06F 3/0346* (2013.01)

(58) Field of Classification Search
CPC ............... G01C 9/06; H04M 2250/12; H04M 1/72454; G06K 9/00221–00389; G06T 2207/30196–30201; H04N 5/23219; H04N 21/4223; H04N 21/44218; A61B 5/1176

See application file for complete search history.

(56) References Cited

U.S. PATENT DOCUMENTS

| | | | |
|---|---|---|---|
| 8,228,292 B1 * | 7/2012 | Ruiz | G06F 1/1626 |
| | | | 345/172 |
| 9,355,094 B2 * | 5/2016 | Cuthbert | G06F 3/167 |
| 2005/0212751 A1 * | 9/2005 | Marvit | G06F 1/1694 |
| | | | 345/156 |
| 2009/0160765 A1 | 6/2009 | Hanyu | |
| 2012/0290304 A1 | 11/2012 | Al-Hasan | |
| 2012/0310622 A1 * | 12/2012 | Zivkovic | G06F 40/58 |
| | | | 704/E15.043 |
| 2015/0370786 A1 * | 12/2015 | Kwon | G06F 3/017 |
| | | | 704/2 |
| 2018/0217985 A1 * | 8/2018 | Saeki | G10L 15/00 |
| 2020/0342063 A1 | 10/2020 | Ma | |

FOREIGN PATENT DOCUMENTS

| | | | | |
|---|---|---|---|---|
| CN | 105373317 A | | 3/2016 | |
| CN | 106528545 A | | 3/2017 | |
| CN | 107315740 A | * | 11/2017 | |
| CN | 108307659 A | | 7/2018 | |
| CN | 110188363 A | | 8/2019 | |
| EP | 3007059 A1 | * | 4/2016 | ........... G06F 17/289 |
| WO | 0057255 A1 | | 9/2000 | |

OTHER PUBLICATIONS

The World Intellectual Property Organization (WIPO) International Search Report for PCT/CN2019/118118 Feb. 6, 2020 5 pages (including translation).

China National Intellectual Property Administration (CNIPA) Office Action 1 for 201910346005.2 May 25, 2020 12 pages (including translation).

* cited by examiner

INFORMATION SWITCHING METHOD, APPARATUS AND TRANSLATION DEVICE

CROSS-REFERENCE TO RELATED APPLICATION

This application claim priority to Chinese Patent Application No. 201910346005.2, filed on Apr. 26, 2019, the entire content of which is incorporated herein by reference.

TECHNICAL FIELD

The present disclosure relates to the field of data processing technology and, more particularly, to an information switching method and apparatus, and a translation device.

BACKGROUND

As the globalization progresses, visits and exchanges among various countries have become more and more frequent, such as overseas traveling and interviewing. The language barrier has become a main obstacle in communications with foreigners. Translation devices such as portable translators and translation pens are widely used due to compact size and portability thereof.

Existing translation devices often include language selection buttons. For example, a button 1 corresponds to Chinese and a button 2 corresponds to English. In operation, the user may push button 1 when he/she is speaking Chinese and push button 2 when another person is speaking English. That is, a user has to manually switch the languages by pushing the language selection buttons. Such operation is tedious and prone to mistakes, resulting in ineffectiveness in information switching.

SUMMARY

One aspect of the present disclosure provides an information switching method. The method includes: obtaining tilting information after a tilt direction of a device changes; searching a pre-set tilt direction matching the tilting information and determining pre-set information corresponding to the matched pre-set tilt direction; and switching first input information of the device to second input information, where the second input information is determined based on the pre-set information matching the pre-set tilt direction.

Another aspect of the present disclosure provides an information switching apparatus. The apparatus includes: an information acquisition module configured to obtain tilting information after an tilt direction of a device changes; an information determination module configured to search a pre-set tilt direction matching the tilting information and to determine pre-set information corresponding to the matched pre-set tilt direction; and an information switching module configured to switch first input information of the device to second input information, where the second input information is determined based on the pre-set information matching the pre-set tilt direction.

Another aspect of the present disclosure provides an electronic device. The electronic device includes a memory and one or more programs stored in the memory. Instructions contained in the one or more programs are executed by one or more processors to: obtain tilting information after an tilt direction of a device changes; search a pre-set tilt direction matching the tilting information and determine pre-set information corresponding to the matched pre-set tilt direction; and switch first input information of the device to second input information, where the second input information is determined based on the pre-set information matching the pre-set tilt direction.

Another aspect of the present disclosure provides a computer readable storage medium storing computer instructions. The computer instructions, when being executed by a processor of an electronic device, cause the processor to perform: obtaining tilting information after an tilt direction of a device changes; searching a pre-set tilt direction matching the tilting information and determining pre-set information corresponding to the matched pre-set tilt direction; and switching first input information of the device to second input information, where the second input information is determined based on the pre-set information matching the pre-set tilt direction.

BRIEF DESCRIPTION OF THE DRAWINGS

To more clearly illustrate the technical solution in the present disclosure, the accompanying drawings used in the description of the disclosed embodiments are briefly described hereinafter. The drawings described below are merely some embodiments of the present disclosure. Other drawings may be derived from such drawings by a person with ordinary skill in the art without creative efforts and may be encompassed in the present disclosure.

DETAILED DESCRIPTION OF THE EMBODIMENTS

To make the foregoing objectives, features and advantages of the present disclosure clearer and more understandable, the present disclosure will be further described with reference to the accompanying drawings and embodiments. However, exemplary embodiments may be embodied in various forms and should not be construed as limited to the embodiments set forth herein. Rather, these embodiments are provided to fully convey the thorough and complete concepts of the exemplary embodiments to those skilled in the art.

The present disclosure provides an information switching method of automatically switching input information based on a tilt direction of a device to improve efficiency of information switching.

In some embodiments, the input information may include identification of input voice data. For example, an input language is Chinese, Korean, English, or German, etc. The input information may also include identification of a user of the input voice data, such as an interviewer, a first interviewee, a second interviewee, a host, and a guest, etc. For the input voice data, the voice data may refer to voice data with the identification, such as the user identification. The specifics may be determined according to actual requirements and are not limited by the embodiments of the present disclosure.

Figure 1:
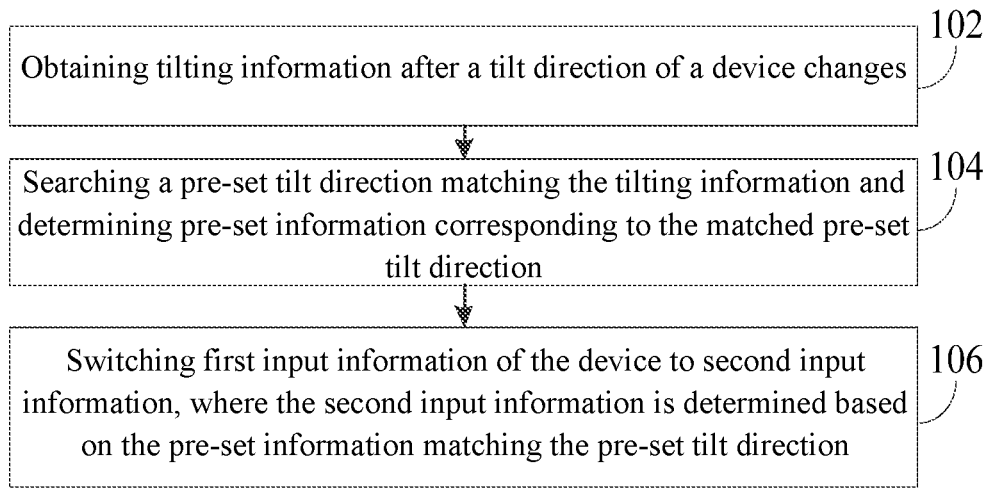
FIG. 1 illustrates a flowchart of an exemplary information switching method according to some embodiments of the present disclosure.

FIG. 1 illustrates a flowchart of an exemplary information switching method according to the present disclosure. As shown in FIG. 1, the method includes the following steps.

Step 102: obtaining tilting information after a tilt direction of a device changes.

Step 104: searching a pre-set tilt direction matching the tilting information and determining pre-set information matching the pre-set tilt direction.

Step 106: switching first input information of the device to second input information, where the second input information is determined based on the pre-set information matching the pre-set tilt direction. In other words, the method may include determining that information inputted to the device (e.g., voice data) is switched from a first type (e.g., first language) to a second type (e.g., second language).

In a process of operating the device, when a switching operation is performed, a user may tilt the device toward a certain direction. For example, in the process of operating a translation device, when a user speaks, a language switching operation is performed, and the translation device is tilted toward the user who speaks. Thus, the device provided by the embodiments of the present disclosure automatically switches the input information based on the tilt direction of the device, thereby improving the efficiency of the information switching.

In some embodiments, the device includes a module for detecting the tilt direction. As such, the device may use the module for detecting the tilt direction to detect the tilt direction. The module for detecting the tilt direction may include, for example, a distance sensor, a gyro sensor, and a camera, etc., which are not limited by the present disclosure.

When the device changes from one tilt direction to another tilt direction, the device may obtain information detected by the module for detecting the tilt direction and determine the tilting information after the tilt direction of the device changes. When the module for detecting the tilt direction is the distance sensor, the device may determine the tilting information after the tilt direction of the device changes based on distance information detected by the distance sensor. The distance information may refer to information of a distance between the device and the user. For example, when one user approaches closer, the device is pointed to the user. Then, the tilting information corresponding to the tilt direction toward the user is determined. When the module for detecting the tilt direction is the gyro sensor, the device may determine the tilting information after the tilt direction of the device changes based on parameters detected by the gyro sensor. When the module for detecting the tilt direction is the camera, the device may determine the tilting information corresponding to the tilt direction pointing toward the user after the identification of the user is determined by obtaining a face image of the user and performing a face recognition process. The embodiments of the present disclosure do not limit the manners of obtaining the tilting information after the tilt direction of the device changes.

In some embodiments, the tilting information may include horizontal angle information and vertical angle information. The horizontal angle information may refer to angle information with respect to a horizontal reference direction (e.g., calculated in a counterclockwise direction). The horizontal reference direction may be configured according to actual requirements. For example, a certain button on the device may be configured as a reference button. The horizontal reference direction may refer to a direction from the center of the reference button to the center of a horizontal cross-sectional plane where the center of the reference button is located, and may indicate orientation of the tilt. The vertical angle information may refer to angle information in the vertical direction, and may indicate extent/amplitude of the tilt.

In some embodiments, the device may provide a plurality of pre-set tilt directions. Each of the plurality of pre-set tilt directions corresponds to a pre-set range. When the tilting information falls within one of the pre-set ranges, the corresponding tilt direction is determined to be the pre-set tilt direction. The user may pre-configure respective pre-set information corresponding to each of the plurality of pre-set tilt directions. For example, the pre-set information 1 is configured to correspond to the pre-set tilt direction 1, the pre-set information 2 is configured to correspond to the pre-set tilt direction 2, the pre-set information 3 is configured to correspond to the pre-set tilt direction 3, and so on so forth. The pre-set information of any two pre-set tilt directions may be the same or different, which is not limited by the present disclosure. The pre-set information may include a pre-set language and a pre-set user identification, which are not limited by the present disclosure.

Further, after the tilting information is determined after the tilt direction of the device changes, the tilting information is compared with each pre-set range corresponding to each of the plurality of pre-set tilt directions to search for the pre-set tilt direction matching the tilting information. Then, the pre-set information corresponding to the pre-set tilt direction matching the tilting information is determined. Based on the pre-set information, the corresponding second input information is determined. For example, the second input information may be the pre-set information, or the voice data with the pre-set information, which is not limited by the present disclosure. Then, the first input information is switched to the second input information. The first input information may refer to the input information of the device at a previous time or the input information corresponding to a preceding pre-set tilt direction, which is determined according to actual requirements and is not limited by the present disclosure. Thus, the device may automatically switch the input information based on the tilt direction, thereby improving the efficiency of information switching.

In the embodiments of the present disclosure, the tilting information is obtained after the tilt direction of the device changes. The pre-set tilt direction matching the tilting information is searched and the pre-set information matching the pre-set tilt direction is determined. The first input information of the device is switched to the second input information, which is determined based on the pre-set information matching the pre-set tilt direction. Compared with the manual switching in the existing technology, the embodiments of the present disclosure automatically switch the input information of the device based on the tilt direction of the device, thereby improving the efficiency of the information switching.

The device may be a voice recording device. When the device is the voice recording device, the input information is the inputted voice data with the identification and the pre-set information is the pre-set user identification. The tilting information obtained after the tilt direction of the voice recording device changes is used to search for the pre-set tilt direction matching the tilting information. The pre-set information (i.e., the pre-set user identification) matching the pre-set tilt direction is determined. The first input information of the voice recording device is switched to the second input information (i.e., the voice data with the pre-set user identification matching the pre-set tilt direction). Thus, the speaker is automatically recognized.

To facilitate those skilled in the art to better understand the technical solutions provided by the embodiments of the present disclosure, the device may also be a translation device. When the device is the translation device, the information switching method provided by the embodiments of the present disclosure is described below assuming that the input information is the input language and the pre-set information is the pre-set language.

The translation device may be a device capable of translating, such as the portable translator and the translation pen, which is not limited by the present disclosure.

Figure 2A:
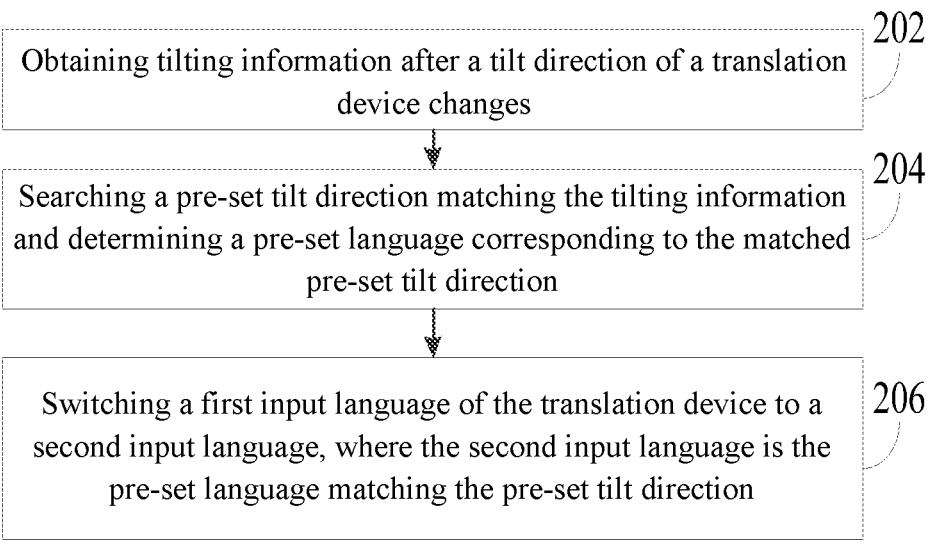
FIG. 2A illustrates a flowchart of another exemplary information switching method according to some embodiments of the present disclosure.

FIG. 2A illustrates a flowchart of another exemplary information switching method according to the present disclosure. As shown in FIG. 2A, the method includes the following steps.

Step 202: obtaining tilting information after a tilt direction of a translation device changes.

Step 204: searching a pre-set tilt direction matching the tilting information and determining a pre-set language corresponding to the matched the pre-set tilt direction.

Step 206: switching a first input language of the translation device to a second input language, where the second input language is the pre-set language matching the pre-set tilt direction.

In a process of operating the translation device, when a user speaks, the translation device is pointed to the user to collect the voice data of the user. As such, the input language of the translation device is determined based on the tilt direction of the translation device. After the translation device is pointed to a different speaker, the input language is automatically switched. The input language may be the language corresponding to the voice data collected by the translation device.

In some embodiments, a module for detecting the tilt direction is configured at the translation device. The translation device may use the module for detecting the tilt direction to detect the tilt direction. The module for detecting the tilt direction may include, for example, the distance sensor, the gyro sensor, and the camera, etc., which is not limited by the present disclosure.

When the speaker changes, the translation device changes the tilt direction from pointing one speaker to pointing to another speaker. The translation device retrieves information detected by the module for detecting the tilt direction to obtain the tilting information after the tilt direction of the translation device changes. The tilting information may include the horizontal angle information and the vertical angle information. The horizontal angle information may refer to the angle information with respect to the horizontal reference direction (e.g., calculated in the counterclockwise direction). The horizontal reference direction may be configured according to actual requirements. For example, a recording button on the translation device may be configured as the reference button. The horizontal reference direction may refer to the direction from the center of the recording button to the center of the horizontal cross-sectional plane where the center of the recording button is located, and may indicate orientation of the tilt. The vertical angle information may refer to the angle information in the vertical direction, and may indicate extent/amplitude of the tilt.

In some embodiments, the translation device may provide a plurality of pre-set tilt directions. Each of the plurality of pre-set tilt directions corresponds to a pre-set range. When the tilting information falls within one of the pre-set ranges, the tilt direction is determined to be the corresponding pre-set tilt direction. The user may pre-configure respective pre-set language corresponding to each of the plurality of pre-set tilt directions. For example, the pre-set language corresponding to the pre-set tilt direction 1 is Chinese, the pre-set language corresponding to the pre-set tilt direction 2 is English, and the pre-set language corresponding to the pre-set tilt direction 3 is Korean. The pre-set languages of any two pre-set tilt directions may be the same or different, which is not limited by the present disclosure. The pre-set information may include the pre-set language and the pre-set user identification, which are not limited by the present disclosure. Further, after the tilting information is determined after the tilt direction of the translation device changes, the tilting information is compared with each pre-set range corresponding to each of the plurality of pre-set tilt directions to search for the pre-set tilt direction matching the tilting information. Then, the pre-set language corresponding to the pre-set tilt direction matching the tilting information is determined to be the second input language. The first input language of the translation device is switched to the second input language. The first input language may refer to the pre-set language corresponding to the preceding pre-set tilt direction. As such, after the translation device obtains the voice data after the tilt direction of the translation device changes, the translation device performs a voice recognition process based on the corresponding pre-set language and translates based on voice recognition results.

Figure 2B:
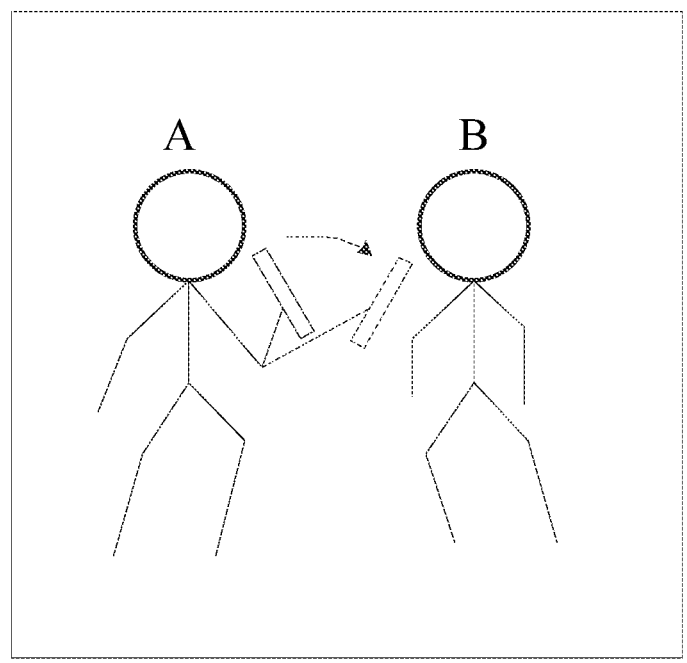
FIG. 2B illustrates a process of changing a tilt direction of an exemplary translation device according to some embodiments of the present disclosure.

In one embodiment, referring to FIG. 2B, after the user A changes the tilt direction of the translation device from pointing to the user A to pointing to the user B, the translation device may obtain the tilting information after the tilt direction of the translation device changes, search for the pre-set tilt direction matching the tilting information, such as the pre-set tilt direction 1, and determine the pre-set language corresponding to the pre-set tilt direction, such as Chinese corresponding to the pre-set tilt direction 1. The first input language of the translation device is switched to the second input language, which is the pre-set language corresponding to the pre-set tilt direction. That is, the first input language is switched to Chinese.

Figure 2C:
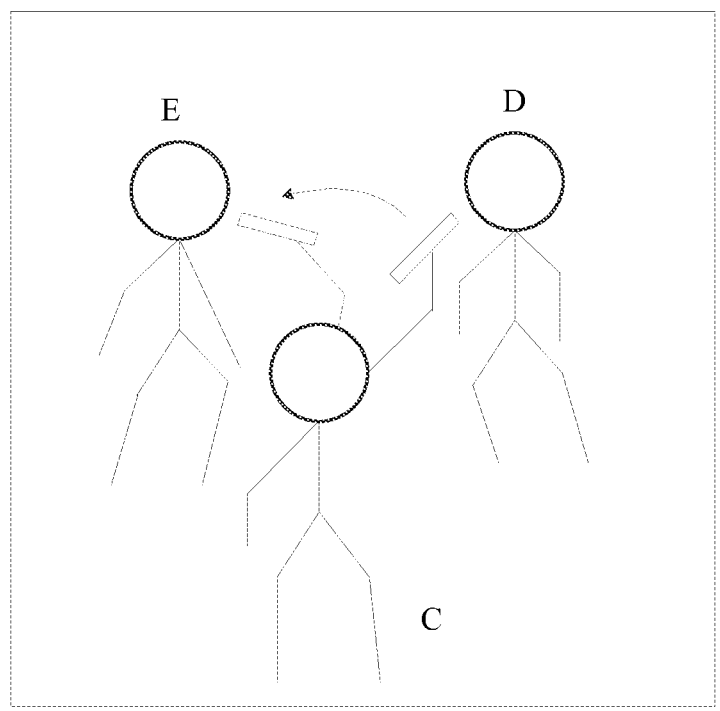
FIG. 2C illustrates another process of changing the tilt direction of an exemplary translation device according to some embodiments of the present disclosure.

In another embodiment, referring to FIG. 2C, after the user C changes the tilt direction of the translation device from pointing to the user D to pointing to the user E, the translation device may obtain the tilting information after the tilt direction of the translation device changes, search for the pre-set tilt direction matching the tilting information, such as the pre-set tilt direction 2, and determine the pre-set language corresponding to the pre-set tilt direction, such as English corresponding to the pre-set tilt direction 2. The first input language of the translation device is switched to the second input language, which is the pre-set language corresponding to the pre-set tilt direction. That is, the first input language is switched to English.

In the embodiments of the present disclosure, the tilting information is obtained after the tilt direction of the translation device changes. The pre-set tilt direction is searched to match the tilting information. The pre-set language corresponding to the pre-set tilt direction is determined. The first input language of the translation device is switched to the second input language, which is the pre-set language corresponding to the matched pre-set tilt direction. Compared with the manual switching in the existing technology, the embodiments of the present disclosure automatically switch the input language based on the tilt direction of the translation device, thereby improving the efficiency of the input language switching and the translation.

In one embodiment, the user may pre-configure the pre-set language corresponding to each of the plurality of pre-set tilt directions according to actual requirements. Names of the plurality of pre-set tilt directions may include direction description information. For example, the names of the plurality of pre-set tilt directions may include a recording button forward tilt direction, a recording button backward tilt direction, a recording button leftward tilt direction, a recording button rightward tilt direction, and other tilt directions in other manners of describing direction information, which are not limited by the present disclosure. The recording button of the translation device may refer to the button for recording the voice data. The voice data recording may start and continue while the user long is pressing the recording button. Alternatively, the voice data recording may start after the user presses the recording button once and may stop after the user presses the recording button again. The embodiments of the present disclosure do not limit controls of the voice data recording. When the user performs the configuration operation, the translation device may receive a user configuration command to establish a mapping relationship between a pre-set tilt direction and a corresponding pre-set language. The user may each time configure one pre-set tilt direction and one corresponding pre-set language. Correspondingly, the translation device may receive the user configuration command that includes one pre-set tilt direction and one pre-set language corresponding to the pre-set tilt direction. The user may also each time configure two or more pre-set tilt directions and the corresponding pre-set languages. Correspondingly, the translation device may receive the user configuration command that includes two or more pre-set tilt directions and the respective pre-set languages corresponding to the two or more pre-set tilt directions. The embodiments of the present disclosure do not limit the format of the user configuration command. Then, the mapping relationship between the pre-set tilt direction and the corresponding pre-set language in each user configuration command is established and saved.

In one embodiment, when only some of the plurality of pre-set tilt directions provided by the translation device are needed by the user, the user may configure the pre-set languages corresponding to the unneeded pre-set tilt directions as null. If the pre-set languages corresponding to the unneeded pre-set tilt directions are configured as null at the time of shipment or previously by the user, the user only needs to configure the pre-set languages corresponding to the needed pre-set tilt directions respectively and needs not to configure the pre-set languages corresponding to the unneeded pre-set tilt directions.

In addition, when the respective pre-set languages corresponding to the plurality of pre-set tilt directions are configured in the translation device at the time of shipment, the user needs not to configure the respective pre-set languages corresponding to the unneeded pre-set tilt directions.

In one embodiment, the angle between the translation device and the horizontal reference direction may indicate the orientation of the tilt. As such, the translation device may configure the pre-set tilt direction pointing to the horizontal reference direction as the pre-set tilt direction corresponding to the native language of a holder of the translation device. For example, the horizontal reference direction may refer to the direction from the center of the recording button of the translation device to the center of the horizontal cross-sectional plane where the center of the recording button is located. "recording button forward direction" may be configured as the pre-set tilt direction corresponding to the native language of the holder of the translation device. For example, the native language of the holder of the translation device is Chinese. The user may configure Chinese as the pre-set language corresponding to the "recording button forward direction". In another example, the native language of the holder of the translation device is English. The user may configure English as the pre-set language corresponding to the "recording button forward direction". As such, it is convenient for the user to operate the translation device.

Further, the user may adjust the pre-set range corresponding to each of the plurality of pre-set tilt directions, such that the adjusted pre-set tilt directions better accommodate personal preferences of the user, thereby reducing false identification of the tilt direction of the translation device and improving the translation efficiency.

In some embodiments, after establishing the mapping relationships, the translation device may subsequently update the mapping relationships. The translation device may obtain geographic location information and determine a language matching the geographic location information. The language matching the geographic location information may be used to update the pre-set language corresponding to the pre-set tilt direction in the mapping relationship. For example, in the mapping relationship, the pre-set tilt direction satisfying a language updating condition is selected, and then the pre-set language corresponding to the pre-set tilt direction satisfying the language updating condition in the mapping relationship is updated to the language matching the geographic location information. The language updating condition may be configured according to actual requirements. For example, the pre-set language is not the native language. The language corresponding to the geographic location information is Korean. The mapping relationships include: recording button forward direction—Chinese and recording button backward direction—English. Then, the "recording button backward direction" is determined to be the pre-set tilt direction satisfying the language updating condition, and the pre-set language corresponding to the "recording button backward direction" is updated to Korean. Thus, re-configuration by the user is not required and the operation of the translation device is simplified. In another example, the language corresponding to the geographic location information is Korean. The mapping relationships include: recording button forward direction—Chinese, recording button backward direction—English, recording button leftward direction—Japanese, and recording button rightward direction—German. Then, "recording button backward direction", "recording button leftward direction", and "recording button rightward direction" are determined to be the pre-set tilt directions satisfying the language updating condition. The pre-set languages corresponding to the three pre-set tilt directions are updated to Korean. As such, the re-configuration by the user is not required when the languages spoken by other speakers are Korean. When the native languages spoken by some other speakers are not Korean, the user may only re-configure the pre-set languages corresponding to some pre-set tilt directions, thereby simplifying the operation.

Figure 3:
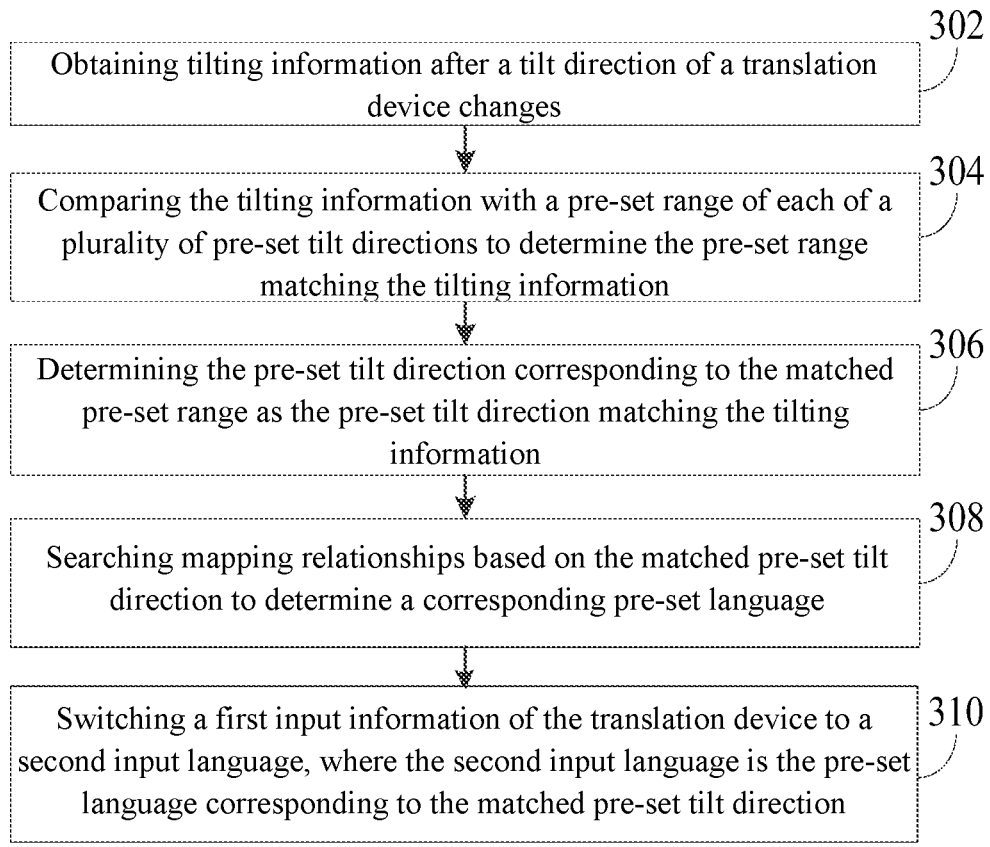
FIG. 3 illustrates a flowchart of another exemplary information switching method according to some embodiments of the present disclosure.

FIG. 3 illustrates a flowchart of another exemplary information switching method according to the present disclosure. As shown in FIG. 3, the information switching method may include the following steps.

Step 302: obtaining tilting information after a tilt direction of a translation device changes.

In some embodiments, the sensor for detecting the tilt direction of the translation device may obtain the tilting information of the translation device in real time to determine whether the tilt direction of the translation device changes. When the tilting information of the translation device no longer satisfies the pre-set range corresponding to the pre-set tilt direction at the previous moment (e.g., from pointing to one speaker to pointing another speaker) or satisfies the pre-set range corresponding to a different pre-set tilt direction (e.g., from vertical direction to pointing to one speaker), it is determined that the tilt direction of the translation device changes. Then, the sensor may continue to obtain the tilting information of the translation device. When a difference between two adjacent tilting information of the translation device is smaller than a threshold (configured according to actual requirements) for multiple times in a row, it is determined that the user stops changing the tilt direction of the translation device. At this time, the sensor may obtain the tilting information of the translation device again and the obtained tilting information is considered as the tilting information after the tilt direction of the translation device changes.

Step 304: comparing the tilting information with a pre-set range of each of a plurality of pre-set tilt directions to determine the pre-set range matching the tilting information.

Step 306: determining the pre-set tilt direction corresponding to the matched pre-set range as the pre-set tilt direction matching the tilting information.

In some embodiments, the pre-set range corresponding to the pre-set tilt direction may include the horizontal angle range and the vertical angle range. For example, the pre-set range corresponding to the "recording button forward direction" includes the horizontal angle range 345°~15° and the vertical angle range 30°~75°. The pre-set range corresponding to the "recording button backward direction" includes the horizontal angle range 165°~195° and the vertical angle range 30°~75°. The pre-set range corresponding to the "recording button leftward direction" includes the horizontal angle range 255°~285° and the vertical angle range 30°~75°. The pre-set range corresponding to the "recording button rightward direction" includes the horizontal angle range 75°~105° and the vertical angle range 30°~75°.

Therefore, the tilting information obtained after the tilt direction of the translation device changes is compared with the pre-set range corresponding to each of the plurality of pre-set tilt directions. For the pre-set range corresponding to the pre-set tilt direction, the horizontal angle information of the tilting information obtained after the tilt direction of the translation device changes may be compared with the horizontal angle range of the pre-set range corresponding to each of the plurality of pre-set tilt directions, and the vertical angle information of the tilting information may be compared with the vertical angle range of the pre-set range corresponding to each of the plurality of pre-set tilt directions. When both the horizontal angle information and the vertical angle information of the tilting information are within the horizontal angle range and the vertical angle range of a same pre-set range, respectively, it is determined that the pre-set range matches the tilting information. Then, the pre-set tilt direction corresponding to the pre-set range is determined to be the pre-set tilt direction matching the tilting information.

Step 308: searching mapping relationships based on the matched pre-set tilt direction to determine a corresponding pre-set language.

Then, the previously established mapping relationships are obtained. Based on the matched pre-set tilt direction, the mapping relationships are searched to determine the corresponding pre-set language. Then, the pre-set language is determined to be the second input language.

Step 310: switching a first input language of the translation device to a second input language, where the second input language is the pre-set language corresponding to the matched pre-set tilt direction.

In one embodiment, after the translation device searches the pre-set tilt direction matching the tilting information, a reminder operation may be performed. The reminder operation may include at least one of vibration or a visual indicator to remind the holder of the translation device that the translation device in the current tilt direction is ready for recording. The visual indicator may display reminder information in different colors or in one color with different illumination cadences, such as solid on or blinking. The on-off timing of the visual indicator may be configured according to actual requirements and is not limited by the present disclosure. The reminder operation may also be in other forms, which are not limited by the present disclosure. In addition, the translation device may perform the reminder operation before or after any of the steps after the step 306, which is not limited by the present disclosure.

In the embodiments of the present disclosure, the tilting information is obtained after the tilt direction of the translation device changes. The pre-set tilt direction is searched to match the tilting information. The pre-set language corresponding to the pre-set tilt direction is determined. The first input language of the translation device is switched to the second input language, which is the pre-set language corresponding to the matched pre-set tilt direction. Compared with the manual switching in the existing technology, the embodiments of the present disclosure automatically switch the input language based on the tilt direction of the translation device, thereby improving the efficiency of the input language switching and the translation.

In some embodiments, the tilting information may be compared with the pre-set range corresponding to each of the plurality of pre-set tilt directions, respectively, to determine the pre-set range matching the tilting information. The pre-set tilt direction corresponding to the matched pre-set range is determined to be pre-set tilt direction matching the tilting information. Then, the matched pre-set tilt direction is searched in the mapping relationships to determine the corresponding pre-set language. As such, the language corresponding to the tilting information obtained after the tilt direction of the translation device changes is quickly determined, thereby improving the translation efficiency.

In one embodiment, after the translation device switches the input language of the translation device to the pre-set language corresponding to the changed tilt direction, the translation device may collect the voice data and translate the collected voice data.

Figure 4:
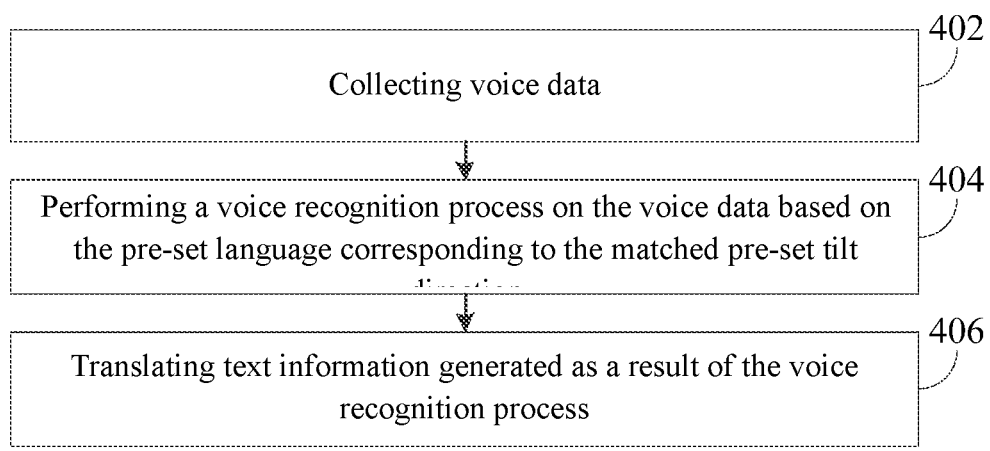
FIG. 4 illustrates a flowchart of an exemplary translation method according to some embodiments of the present disclosure.

FIG. 4 illustrates a flowchart of an exemplary translation method according to the present disclosure. As shown in FIG. 4, the translation method includes the following steps.

Step S402: collecting voice data.

In some embodiments, the recording operation of the translation device is long pressing the recording button. After the input language is switched, the recording operation is performed while the recording button is being pressed, that is, the voice data is collected. In some other embodiments, the recording operation of the translation device starts when the recording button is pressed once and stops when the recording button is pressed again. After the input language is switched, the recording operation starts when the recording button is pressed and releases, and the voice data is collected. The recording operation stops when the recording button is pressed and released again.

Step 404: performing a voice recognition process on the voice data based on the pre-set language corresponding to the matched pre-set tilt direction.

In one embodiment, the pre-set language corresponding to the matched pre-set tilt direction and the voice data are inputted into a voice recognition model. The voice recognition model performs the voice recognition process to determine the corresponding text information. In the process of recording, the voice data may be subject to the voice recognition in real time. Alternatively, the entire voice data may be subject to the voice recognition after the recording is completed. How the voice recognition process is performed is determined according to actual requirements and is not limited by the present disclosure. In addition, the voice recognition process may be performed on the voice data by the translation device or by a server, which is not limited by the present disclosure.

Step 406: translating text information generated as a result of the voice recognition process.

The text information generated as the result of the voice recognition process is translated. In one embodiment, the text information generated as the result of the voice recognition process is translated into the text information in the pre-set language corresponding to other pre-set tilt direction. When the mapping relationships of the translation device include two pre-set tilt directions and the corresponding pre-set languages, the other pre-set tilt direction may refer to the pre-set tilt direction before the tilt direction of the translation device changes. As such, the text information generated as the result of the voice recognition process is translated into the text information in the pre-set language corresponding to the pre-set tilt direction before the tilt direction of the translation device changes, thereby achieving interactive translation between two languages.

When the mapping relationships of the translation device include the plurality of pre-set tilt directions and the corresponding pre-set languages, the other pre-set tilt direction may refer to the pre-set tilt directions other than the pre-set tilt direction after the tilt direction of the translation device changes. As such, the text information generated as the result of the voice recognition process is translated into the text information in the pre-set languages corresponding to the pre-set tilt directions other than the pre-set tilt direction after the tilt direction of the translation device changes, thereby achieving the translation from one language to a plurality of different languages.

In the embodiments of the present disclosure, after the translation device switches the input language of the translation device to the pre-set language corresponding to the changed tilt direction, the voice data is collected. The voice recognition process is performed on the voice data according to the pre-set language corresponding to the matched pre-set tilt direction. The efficiency of the voice recognition is improved. The text information generated as the result of the voice recognition process is translated, thereby achieving interactive translation between different languages.

It should be noted that, for simplifying the description, the embodiments of the method are expressed as a series of steps. However, those skilled in the art should understand that the embodiments of the present disclosure are not limited by the described order of the steps. Based on the embodiments of the present disclosure, certain steps may be performed in other order or may be performed simultaneously. Further, the embodiments described in the specification are preferred embodiments, and the involved steps are not necessarily required by the embodiments of the present disclosure.

Figure 5:
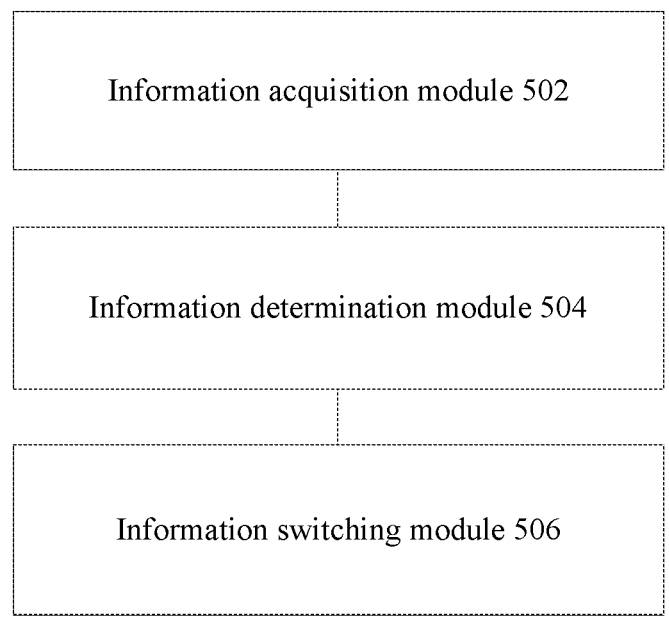
FIG. 5 illustrates a block diagram of an exemplary information switching apparatus according to some embodiments of the present disclosure.

FIG. 5 illustrates a block diagram of an exemplary information switching apparatus according to the present disclosure. As shown in FIG. 5, the information switching apparatus may include an information acquisition module 502, an information determination module 504, and an information switching module 506. The information acquisition module 502 is configured to obtain the tilting information after the tilt direction of the device changes. The information determination module 504 is configured to search the pre-set tilt direction matching the tilting information and to determine the pre-set information corresponding to the matched pre-set tilt direction. The information switching module 506 is configured to switch the first input information of the device to the second input information, which is determined based on the pre-set information matching the pre-set tilt direction.

Figure 6:
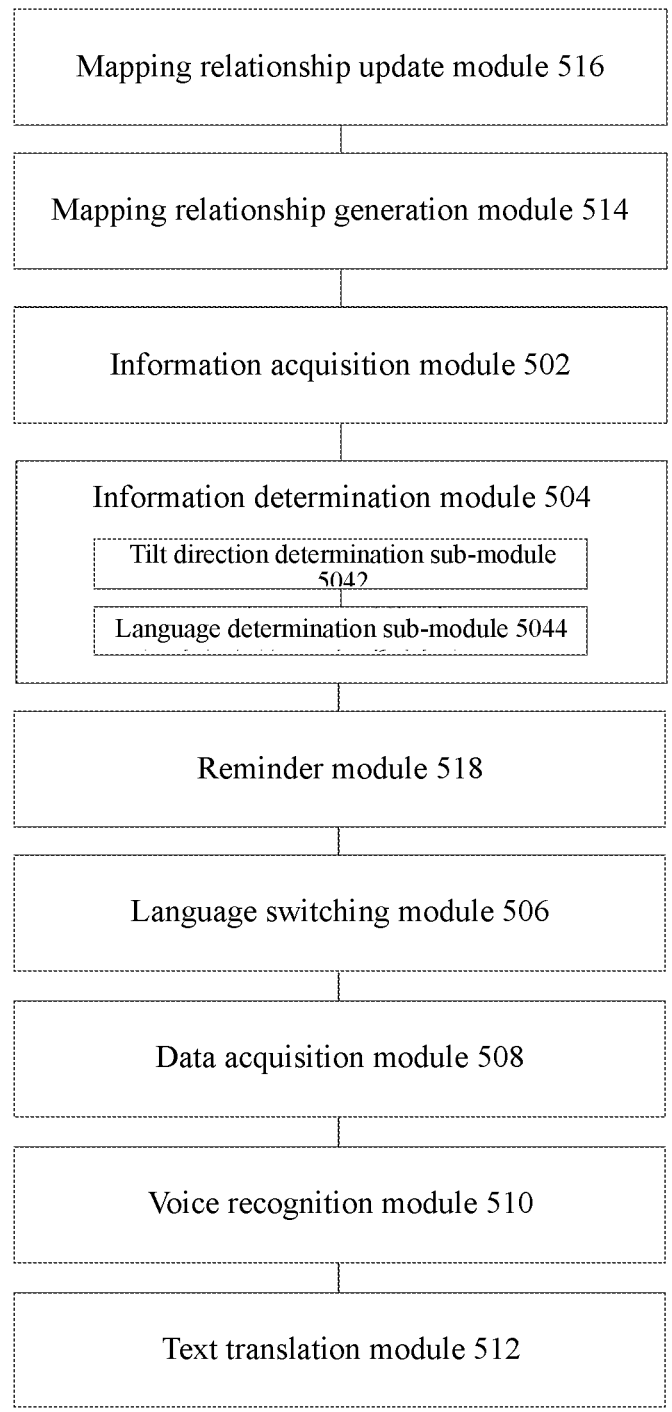
FIG. 6 illustrates a block diagram of another exemplary information switching apparatus according to some embodiments of the present disclosure.

FIG. 6 illustrates a block diagram of another exemplary information switching apparatus according to the present disclosure. In one embodiment, as shown in FIG. 6, the information determination module 504 includes a tilt direction determination sub-module 5042 configured to compare the tilting information with the pre-set range of each of the plurality of pre-set tilt directions to determine the pre-set range matching the tilting information, and to determine the pre-set tilt direction corresponding to the pre-set range as the pre-set tilt direction matching the tilting information.

In one embodiment, the information determination module 504 further includes a language determination sub-module 5044 configured to search the mapping relationships based on the matched pre-set tilt direction to determine the corresponding pre-set information. The mapping relationships include the relationships between the plurality of pre-set tilt directions and the corresponding pre-set information.

In one embodiment, the pre-set information includes the pre-set language. The second input information is the pre-set language matching the pre-set tilt direction. The information switching apparatus further includes a data acquisition module 508 configured to collect the voice data, a voice recognition module 510 configured to perform the voice recognition process on the voice data based on the pre-set language corresponding to the matched pre-set tilt direction, and a text translation module 512 configured to translate the text information generated as the result of the voice recognition process.

In one embodiment, the text translation module 512 is configured to translate the text information generated as the result of the voice recognition process into the text information in the pre-set language corresponding to the other pre-set tilt direction.

In one embodiment, the information switching apparatus further includes a mapping relationship generation module 514 configured to receive a user configuration command and establish a mapping relationship between the pre-set tilt direction corresponding to the user configuration command and the pre-set information corresponding to the pre-set tilt direction.

In one embodiment, the information switching apparatus further includes a mapping relationship update module 516 configured to obtain geographic location information to determine the information matching the geographic location information, and to update the pre-set information corresponding to the pre-set tilt direction in the mapping relationship with the information matching the geographic location information.

In one embodiment, the information switching apparatus further includes a reminder module 518 configured to perform a reminder operation, which includes at least one of vibration or a visual indicator.

In the embodiments of the present disclosure, the tilting information is obtained after the tilt direction of the device changes. The pre-set tilt direction matching the tilting information is searched and the pre-set information matching the pre-set tilt direction is determined. The first input information of the device is switched to the second input information, which is determined based on the pre-set information matching the pre-set tilt direction. Compared with the manual switching in the existing technology, the embodiments of the present disclosure automatically switch the input information of the device based on the tilt direction of the device, thereby improving the efficiency of the information switching.

Because the embodiments of the information switching apparatus are basically similar to the embodiments of the information switching method, the description of the embodiments of the information switching apparatus is relatively simple, and the relevant parts may be referred to the description of the embodiments of the information switching method.

Figure 7:
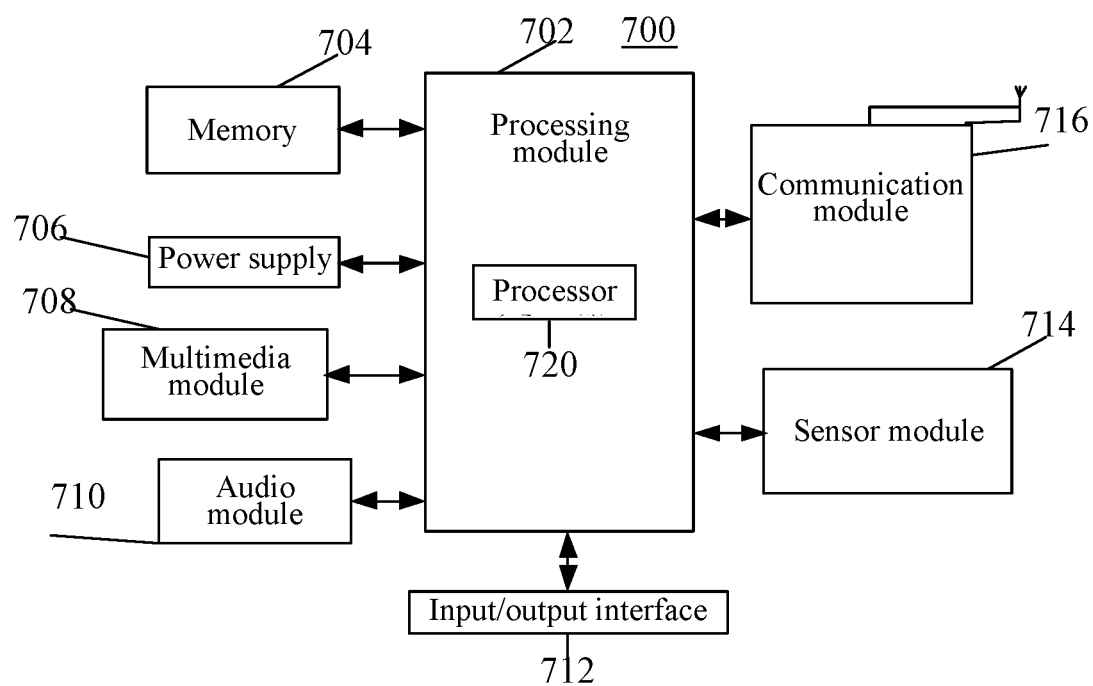
FIG. 7 illustrates a block diagram of an exemplary electronic device for information switching according to some embodiments of the present disclosure.

FIG. 7 illustrates a block diagram of an exemplary electronic device for information switching according to the present disclosure. For example, the electronic device may be a mobile phone, a computer, a digital broadcast terminal, a messaging device, a gaming console, a tablet device, a medical device, a fitness device, or a personal digital assistant, etc.

Referring to FIG. 7, the electronic device may include one or more of the following modules: a processing module 702, a memory 704, a power supply 706, a multimedia module 708, an audio module 710, an input/output interface 712, a sensor module 714, and a communication module 716.

The processing module 702 often controls the overall operation of the electronic device 700, such as operations including displaying, phone call, data communication, camera operation, and recording operation. The processing module 702 may include one or more processors 720 for executing instructions to implement some or all steps of the information switching method according to the present disclosure. In addition, the processing module 702 may include one or more sub-modules for interactions between the processing module 702 and other modules. For example, the processing module 702 may include a multimedia sub-module to facilitate the interaction between the multimedia module 708 and the processing module 702.

The memory 704 is configured to store various types of data to support the operations of the electronic device 700. For example, the data may include instructions of application programs or methods executed by the electronic device 700, contact data, phone book data, messages, images, and videos, etc. The memory 704 may be implemented by any type of volatile or non-volatile storage devices or combinations thereof, such as a static random-access memory (SRAM), an electrically erasable programmable read-only memory (EEPROM), an erasable programable read-only memory (EPROM), a programmable read-only memory (PROM), a read-only memory (ROM), a magnetic memory, a flash memory, a magnetic disk, or an optical disk.

The power supply module 706 supplies power to various modules of the electronic device 700. The power supply module 706 may include a power management system, one or more power sources, and other sub-modules for generating, managing, and distributing the power supply for the electronic device 700.

The multimedia module 708 may include a display screen as an output interface between the electronic device 700 and a user. In some embodiments, the display screen may include a liquid crystal display (LCD) screen and a touch panel (TP). When the display screen includes the touch panel, the display screen may become a touch screen for receiving input signals from the user. The touch panel may include one or more touch sensors for detecting touches, slides, and gestures on the touch panel. The touch sensors may not only detect boundaries of the touches or slides, but also detect duration and pressure of the touches or slides. In some embodiments, the multimedia module 708 may include a front camera and/or a rear camera. When the electronic device 700 is in an operational mode, such as a photographing mode or a video recording mode, the front camera and/or the rear camera may receive external multimedia data. Each of the front camera and/or the rear camera may include a fixed focal length optical lens system or a variable focal length optical lens system.

The audio module 710 is configured to output and/or input audio signals. For example, the audio module 710 may include a microphone. When the electronic device 700 is in an operational mode, such as a calling mode, a recording mode, or a voice recognition mode, the microphone is configured to receive external audio signals. The received audio signals may be stored in the memory 704 or may be transmitted through the communication module 716. In some embodiments, the audio module 710 may also include a speaker configured to output audio signals.

The input/output interface 712 provides the interface between the processing module 702 and peripheral interface sub-modules. The peripheral interface sub-modules may include a keyboard, a mouse, and a button. The button may include, but is not limited to, a home button, a volume button, a start button, and a lock button.

The sensor module 714 may include one or more sensors configured to monitor various status of the electronic device 700. For example, the sensor module 714 may detect the on/off status of the electronic device 700 and relative position of various modules, such as the display screen and the keyboard of the electronic device 700. The sensor module 714 may also detect the position change of the electronic device 700 or one of the modules of the electronic device 700, the presence or absence of user contact with the electronic device 700, the tilt direction or acceleration/deceleration of the electronic device 700, and the temperature change of the electronic device 700. The sensor module 714 may include a proximity sensor configured to detect the presence of nearby objects without any physical contact. The sensor module 714 may also include an optical sensor, such as a CMOS or CCD imaging sensor, for use in imaging applications. In some embodiments, the sensor module 714 may also include an acceleration sensor, a gyro sensor, a magnetic sensor, a pressure sensor, and a temperature sensor.

The communication module 716 is configured to support wired or wireless communications between the electronic device 700 and other devices. The electronic device 700 may access a standard-compliant wireless network, such as, WiFi™, 2G, 3G, or 4G mobile networks or combinations thereof. In one embodiment, the communication module 716 may receive broadcast signals or broadcast related information from an external broadcast management system through a broadcast channel. In one embodiment, the communication module 716 may also include a near field communication (NFC) sub-module for short range communications. For example, the NFC sub-module may support the radio frequency identification (RFID) technology, the infrared data association (IrDA) technology, the ultra-wideband (UWB) technology, the Bluetooth™ (BT) technology, and other suitable technologies.

In some embodiments, the electronic device 700 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor, or other electronic components for implementing the disclosed method.

In some embodiments, the electronic device 700 may also provide a non-transitory computer readable storage medium storing instructions, such as the memory 704 storing the instructions. The instructions may be executed by the processing module 702 of the electronic device 700 for implementing the disclosed method. For example, the non-transitory computer readable storage medium may include a ROM, a RAN, a CD-ROM, a magnetic tape, a floppy disk, and an optical data storage device.

In some embodiments, the instructions are stored in the non-transitory computer readable storage medium. When being executed by the processor of the electronic device, the instructions stored in the storage medium make the electronic device implement the information switching method. The information switching method includes: obtaining the tilting information after the tilt direction of the device changes; searching the pre-set tilt direction matching the tilting information and determining the pre-set information matching the pre-set tilt direction; and switching the first input information of the device to the second input information, which is determined based on the pre-set information matching the pre-set tilt direction.

In some embodiments, searching the pre-set tilt direction matching the tilting information includes: comparing the tilting information with the pre-set range of each of the plurality of pre-set tilt directions to determine the pre-set range matching the tilting information; and determining the pre-set tilt direction corresponding to the matched pre-set range as the pre-set tilt direction matching the tilting information.

In some embodiments, determining the pre-set information corresponding to the pre-set tilt direction includes: searching the mapping relationships based on the matched pre-set tilt direction to determine the corresponding pre-set information. The mapping relationships include the relationships between the plurality of pre-set tilt directions and the corresponding pre-set information.

In some embodiments, the pre-set information includes the pre-set language. The second input information is the pre-set language corresponding to the matched pre-set tilt direction. The information switching method further includes: collecting the voice data; performing the voice recognition process on the voice data based on the pre-set language corresponding to the matched pre-set tilt direction; and translating the text information generated as the result of the voice recognition process.

In some embodiments, translating the text information generated as the result of the voice recognition process includes: translating the text information generated as the result of the voice recognition process into the text information in the pre-set language corresponding to the other pre-set tilt direction.

In some embodiments, the information switching method further includes generating the mapping relationship. Generating the mapping relationship includes: receiving the user configuration command and establishing the mapping relationship between the pre-set tilt direction corresponding to the user configuration command and the pre-set information corresponding to the pre-set tilt direction.

In some embodiments, the information switching method further includes updating the mapping relationship. Updating the mapping relationship includes: obtaining the geographic location information and determining the information matching the geographic location information; and updating the pre-set information corresponding to the pre-set tilt direction in the mapping relationship with the information matching the geographic location information.

In some embodiments, the information switching method further includes performing the reminder operation. The reminder operation includes at least one of vibration or a visual indicator.

Figure 8:
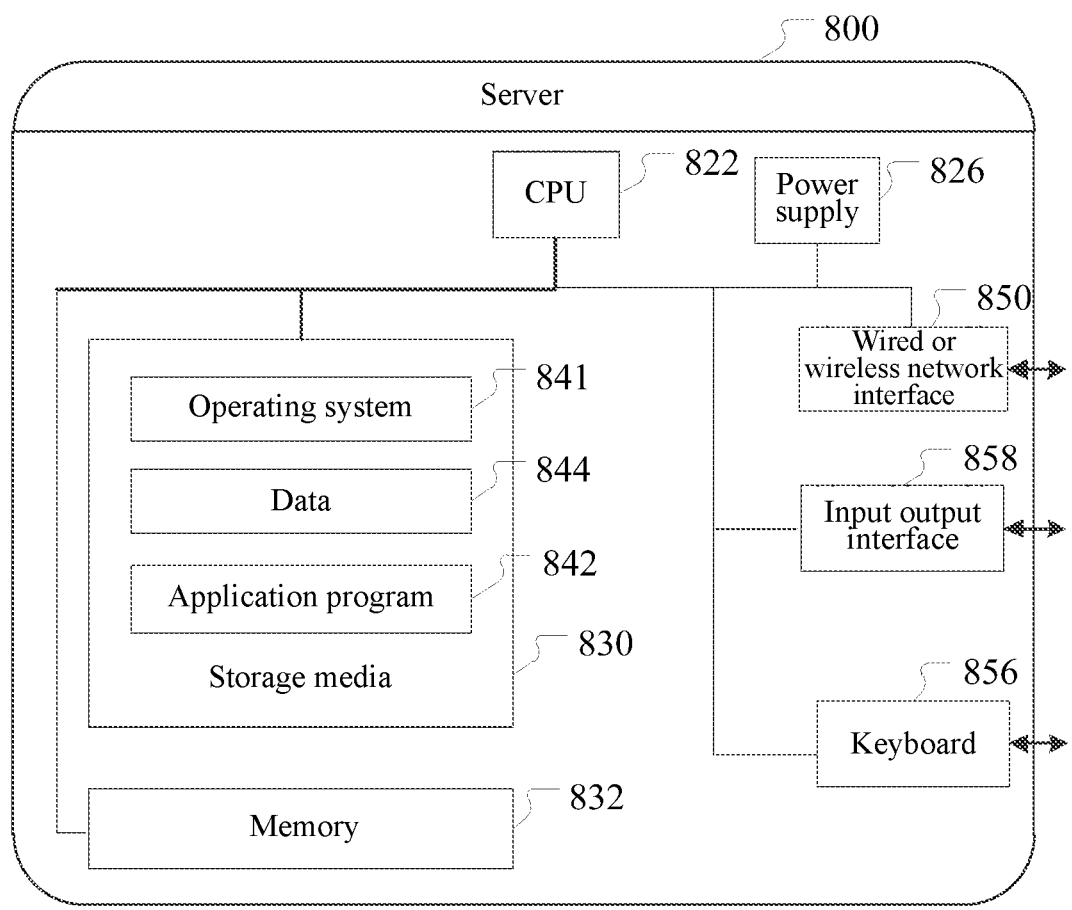
FIG. 8 illustrates a block diagram of another exemplary electronic device for information switching according to some embodiments of the present disclosure.

FIG. 8 illustrates a block diagram of another exemplary electronic device for information switching according to the present disclosure. In some embodiments, the electronic device 800 may be a server. The server may be substantially different depending on the configuration or performance. The server may include one or more central processing units (CPU) 822 (e.g., one or more processors) and a memory 832, and one or more storage media 830 (e.g., one or more massive storage devices) for storing application program 842 or data 844. The memory 832 and the storage media 830 may be volatile or persistent memory. The program stored in the storage media 830 may include one or more modules (not shown). Each module may include a plurality of instructions for the server. Further, the CPU 822 may be configured to communicate with the storage media 830 to execute the plurality of instructions stored in the storage media 830 at the server.

In some embodiments, the server may also include one or more power supplies 826, one or more wired or wireless network interfaces 850, one or more input output interfaces 858, one or more keyboards 856, and/or one or more operating systems 841, such as Windows Server™, Mac OS X™, Unix™, Linux™, and FreeBSD™, etc.

The electronic device provided by the embodiments of the present disclosure includes the memory and one or more programs. The one or more programs are stored in the memory. One or more processors are configured to execute the one or more programs including the instructions for the following operations: obtaining the tilting information after the tilt direction of the electronic device changes; searching the pre-set tilt direction matching the tilting information and determining the pre-set information corresponding to the matched pre-set tilt direction; and switching the first input information of the electronic device to the second input information, which is determined based on the pre-set information matching the pre-set tilt direction.

In some embodiments, searching the pre-set tilt direction matching the tilting information includes: comparing the tilting information with the pre-set range of each of the plurality of pre-set tilt directions to determine the pre-set range matching the tilting information; and determining the pre-set tilt direction corresponding to the matched pre-set range as the pre-set tilt direction matching the tilting information.

In some embodiments, determining the pre-set information corresponding to the pre-set tilt direction includes: searching the mapping relationships based on the matched pre-set tilt direction to determine the corresponding pre-set information. The mapping relationships include the relationships between the plurality of pre-set tilt directions and the corresponding pre-set information.

In some embodiments, the pre-set information includes the pre-set language. The second input information is the pre-set language corresponding to the matched pre-set tilt direction. The information switching method further includes: collecting the voice data; performing the voice recognition process on the voice data based on the pre-set language corresponding to the matched pre-set tilt direction; and translating the text information generated as the result of the voice recognition process.

In some embodiments, translating the text information generated as the result of the voice recognition process includes: translating the text information generated as the result of the voice recognition process into the text information in the pre-set language corresponding to the other pre-set tilt direction.

In some embodiments, the information switching method further includes generating the mapping relationship. Generating the mapping relationship includes: receiving the user configuration command and establishing the mapping relationship between the pre-set tilt direction corresponding to the user configuration command and the pre-set information corresponding to the pre-set tilt direction.

In some embodiments, the information switching method further includes updating the mapping relationship. Updating the mapping relationship includes: obtaining the geographic location information and determining the information matching the geographic location information; and updating the pre-set information corresponding to the pre-set tilt direction in the mapping relationship with the information matching the geographic location information.

In some embodiments, the information switching method further includes performing the reminder operation. The reminder operation includes at least one of vibration or a visual indicator.

The embodiments of the present disclosure are described in a progressive manner. Each embodiment focuses on differences from other embodiments. The same or similar parts between the embodiments may be referred to each other.

The embodiments of the present disclosure are described with reference to the flowcharts and/or block diagrams of the methods, terminal devices (systems), and computer program products. The instructions of the computer programs may implement each step and/or each function block in the flowcharts and/or the block diagrams and various combinations thereof. The instructions of the computer programs may be executed by a general-purpose computer, a special-purpose computer, an embedded processor, or a processor of other programmable data processing terminal device to produce a machine, such that the instructions are executed by the computer or the processor of the other programmable data processing terminal device to produce the apparatus that implements the functions specified in the one or more steps of the flowcharts and/or the one or more function blocks of the block diagrams.

The instructions of the computer programs may be stored in the computer readable media that can direct the computer or the other programmable data processing terminal device to operate in a particular manner, such that the instructions stored in the computer readable memory produce an article of manufacture including the instruction apparatus. The instruction apparatus implements the functions specified in the one or more steps of the flowcharts and/or the one or more function block of the block diagrams.

The instructions of the computer programs may be loaded onto the computer or the other programmable data processing terminal device to perform a plurality of operations on the computer or the other programmable data processing terminal device to produce the computer-implementable processing. As such, the instructions executed by the computer or the other programmable data processing terminal device provide the functions specified in the one or more steps of the flowcharts and/or the one or more function blocks of the block diagrams.

While preferred embodiments of the present disclosure have been described, it is apparent that those skilled in the art can make further changes and modifications to the embodiments. Thus, the appended claims are intended to be interpreted as including all changes and modifications.

Further, it should be noted that, in the specification, relational terms such as "first" and "second" are used merely to distinguish one entity or operation from another entity or operation, and do not necessarily require or imply that there is any such actual relationship or order between these entities or operations. Moreover, terms such as "comprise", "include", or any other variations thereof are intended to encompass a non-exclusive inclusion, such that a process, a method, an article, or a terminal device includes not only listed features or elements, but also other unlisted features or elements, and also includes features or elements inherent to such process, method, article, or terminal device. Without further limitation, a feature or element defined by the phrase "comprising a" does not exclude the presence of additional identical or similar features or elements in the process, the method, the article, or the terminal device that comprises the feature or element.

The information switching method, the information switching apparatus, and the electronic device provided by the embodiments of the present disclosure are described in detail. In the specification, specific embodiments and examples are used to describe the operation principle and the implementation details. The foregoing descriptions are merely intended to assist the comprehension of the methods of the present disclosure and the core concepts, but the scope of the present disclosure is not limited thereto. Without departing from the spirit and principles of the present disclosure, any modifications, equivalent substitutions, and improvements, etc. shall fall within the scope of the present disclosure. Thus, the scope of present disclosure should be determined by the appended claims.

What is claimed is:

1. An information switching method on an exchange between a first speaker speaking in a first input language and a second speaker speaking in a second input language different than the first input language, the method comprising:
    detecting, by a camera of a device, that a tilt direction of the device changes and obtaining tilting information, wherein the tilt information includes a horizontal angle with respect to a horizontal reference direction, and the horizontal reference direction is a direction from a center of a reference button on the device to a center of a horizontal cross-sectional plane of the device where the center of the reference button is located;

searching in a mapping relationship a pre-set tilt direction range corresponding to the tilting information, wherein the mapping relationship includes a first tilt direction range corresponding to the first input language spoken by the first speaker and a second tilt direction range corresponding to the second input language spoken by the second speaker, wherein the mapping relationship further includes a correspondence between a third language and a third tilt direction range, and the method further comprises:

configuring the third language corresponding to the third tilt direction range as null in response to identifying that the third tilt direction range is unneeded; and switching an input language of the device from the first input language to the second input language in response to determining the tilt direction falls within the second tilt direction range.

2. The method of claim 1, further comprising:
collecting voice data in the second input language from the second speaker;
performing a voice recognition process on the voice data, to extract text information from the voice data; and
translating the text information.

3. The method of claim 1, further comprising generating the mapping relationship, including:
receiving a user configuration command prior to receiving an input in the second input language from the second speaker; and
establishing the mapping relationship according to the user configuration command.

4. The method of claim 3, wherein the user configuration command as received includes a first command of establishing a correlation between a pre-set tilt direction range and a pre-set language and includes a second command of establishing a correlation respectively between two pre-set tilt direction ranges and two pre-set languages.

5. The method according to claim 4, further comprising:
saving the correlation established via the first command and saving the correlation established via the second command.

6. The method of claim 1, further comprising:
updating the mapping relationship according to geographic location information.

7. The method of claim 1, further comprising:
performing a reminder operation, the reminder operation including at least one of vibration or a visual indicator.

8. The method according to claim 1, wherein a third speaker joins the exchange and speaks a fourth input language different than the second input language, the mapping relationship further includes a fourth tilt direction range corresponding to the fourth input language, and the method further comprises:
obtaining a second tilt direction of the device after the second speaker speaks;
determining the second tilt direction falls within the fourth tilt direction range corresponding to the fourth input language according to the mapping relationship; and
switching the input language of the device from the second input language to the fourth input language.

9. The method according to claim 1, wherein detecting that the tilt direction of the device changes comprises:
detecting, by the camera, a face image of a speaker;
determining an identification of the speaker by performing a face recognition process on the face image; and
determining that the tilt direction of the device changes based on the face image and the identification.

10. The method according to claim 1, wherein the device is a translation device, and the reference button is a recording button on the translation device.

11. An electronic device comprising a memory and one or more programs stored in the memory, wherein instructions contained in the one or more programs are executed by one or more processors to perform a method on an exchange between a first speaker speaking in a first input language and a second speaker speaking in a second input language different than the first input language, and the method including:

detecting, by a camera of a device, that a tilt direction of the device changes and obtaining tilting information, wherein the tilt information includes a horizontal angle with respect to a horizontal reference direction, and the horizontal reference direction is a direction from a center of a reference button on the device to a center of a horizontal cross-sectional plane of the device where the center of the reference button is located;

searching in a mapping relationship a pre-set tilt direction range corresponding to the tilting information, wherein the mapping relationship includes a first tilt direction range corresponding to the first input language spoken by the first speaker and a second tilt direction range corresponding to the second input language spoken by the second speaker, wherein the mapping relationship further includes a correspondence between a third language and a third tilt direction range, and the method further comprises:

configuring the third language corresponding to the third tilt direction range as null in response to identifying that the third tilt direction range is unneeded; and switching an input language of the device from the first input language to the second input language in response to determining the tilt direction falls within the second tilt direction range.

12. The electronic device of claim 11, wherein the instructions contained in the one or more programs are executed by the one or more processors to
collect voice data in the second input language from the second speaker;
perform a voice recognition process on the voice data, to extract text information from the voice data; and
translate the text information.

13. The electronic device of claim 11, wherein: the instructions contained in the one or more programs are executed by the one or more processors to generate the mapping relationship, including:
receiving a user configuration command prior to receiving an input in the second input language from the second speaker; and
establishing the mapping relationship according to the user con figuration command.

14. The electronic device of claim 11, wherein: the instructions contained in the one or more programs are executed by the one or more processors to update the mapping relationship according to geographic location information.

15. The electronic device of claim 11, wherein: the instructions contained in the one or more programs are executed by the one or more processors to perform a reminder operation, the reminder operation including at least one of vibration or a visual indicator.

16. A non-transitory computer readable storage medium storing computer instructions that, when being executed by a processor of an electronic device, cause the processor to perform a method on an exchange between a first speaker speaking in a first input language and a second speaker speaking in a second input language different than the first input language, and the method including:
- detecting, by a camera of a device, that a tilt direction of the device changes and obtaining tilting information, wherein the tilt information includes a horizontal angle with respect to a horizontal reference direction, and the horizontal reference direction is a direction from a center of a reference button on the device to a center of a horizontal cross-sectional plane of the device where the center of the reference button is located;
- searching in a mapping relationship a pre-set tilt direction range corresponding to the tilting information, wherein the mapping relationship includes a first tilt direction range corresponding to the first input language spoken by the first speaker and a second tilt direction range corresponding to the second input language spoken by the second speaker; and
- switching an input language of the device from the first input language to the second input language in response to determining the tilt direction falls within the second tilt direction range, wherein the method further comprises generating the mapping relationship, including:
- respectively configuring, based on a user configuration command, a first correspondence between the first tilt direction range and the first input language and a second correspondence between the second tilt direction range and the second input language, to generate the mapping relationship, wherein a third language corresponding to an unneeded tilt direction range other than the first and second tilt direction ranges is preset as null at a time of shipment of the electronic device and does not need the user configuration command.

17. The storage medium of claim 16, wherein the computer instructions further cause the processor to perform:
- collecting voice data in the second input language from the second speaker;
- performing a voice recognition process on the voice data, to extract text information from the voice data; and
- translating the text information.

* * * * *